United States Patent Office 3,839,573
Patented Oct. 1, 1974

3,839,573
ANTIFUNGAL COMPOSITIONS AND METHODS OF TREATMENT EMPLOYING N-TRITYL IMIDAZOLES
Karl-Heinz Buchel, Leverkusen, Erik Regel, Wuppertal-Cronenberg, and Manfred Plempel, Wuppertal-Elberfeld, Germany, assignors to Farbenfabriken Bayer Aktiengesellschaft, Leverkusen, Germany
No Drawing. Continuation-in-part of abandoned application Ser. No. 36,423, May 11, 1970, which is a division of application Ser. No. 758,594, Sept. 9, 1968, now Patent No. 3,660,577, dated May 2, 1972. This application July 9, 1971, Ser. No. 161,274
Claims priority, application Germany, Sept. 15, 1967, F 53,504
Int. Cl. A61k 27/00
U.S. Cl. 424—273                 5 Claims

ABSTRACT OF THE DISCLOSURE

N-trityl-imidazoles of the formula:

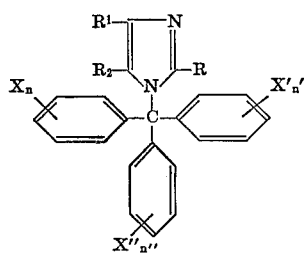

wherein

R, $R^1$ and $R^2$ are hydrogen,
$n$ and $n'$ are 0,
$X''$ is o-methyl or m-methyl, and
$n''$ is 1, or pharmaceutically acceptable non-toxic salts thereof, may be produced by reacting a silver salt or alkali metal salt of an imidazole of the formula:

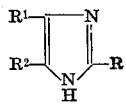

with a trityl halide of the formula:

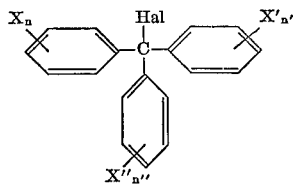

wherein $n$ and $n'$ are 0, and
$X''$ and $n''$ are as above defined, and
Hal is halogen.

These compounds are useful as antimycotics.

---

This is a continuation-in-part of our co-pending application Ser. No. 36,423 filed May 11, 1970 now abandoned, which itself is a division of our co-pending application Ser. No. 758,594 filed Sept. 9, 1968 now U.S. Pat. 3,660,577.

The present invention is concerned with N-trityl-imidazoles and salts thereof and the production of such compounds.

N-trityl-imidazole and N-trityl-imidazoles substituted in the 4 and 5 positions of the imidazole ring are known in the art. See Geisemann et al. Chem. Ber. 92: 92–98, 1959. N-trityl-imidazoles substituted in each of the 3-phenyl rings and/or in the imidazole ring are disclosed as active against plant fungi in U.S. Pat. No. 3,321,366. This patent also discloses plant anti-fungal activity for N-trityl-imidazole and 1-(p-terbutyl-phenyl-diphenyl-methyl)-imidazole.

The present invention is concerned with N-trietyl-imidazoles and salts thereof of the formula:

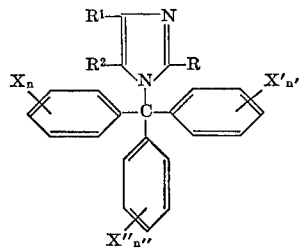

(I)

wherein R, $R^1$ and $R^2$ are hydrogen, lower alkyl or phenyl, or $R^1$ and $R^2$ togeher form an anellated benzene ring,
X, X' and X'' are alkyl of 1 to 12 carbon atoms or an electro-negative moiety, and
$n$, $n'$ and $n''$ are an integer from 0 to 2, or pharmaceutically acceptable acid salts thereof. When R, $R^1$ or $R^2$ are alkyl moieties, those having 1 to 4 carbon atoms are preferred. When X, X' or X'' is an alkyl moiety, it is preferred that such have 1 to 12 carbon atoms and such moieties having 1 to 4 carbon atoms are especially preferred. Electro-negative substituents which are particularly preferred are the halogens, i.e., fluorine, chlorine, bromine and iodine, $NO_2$, $CF_3$, CN, as well as S-lower alkyl and O-lower alkyl; it is preferred that the alkyl moieties have 1 to 4 carbon atoms. The term "alkyl" and "lower alkyl" comprises straight chain as well as branched chain alkyl moieties and also include those containing a double bond.

The salts of the N-trityl-imidazoles (I) are the pharmaceutically acceptable non-toxic acid salts. Examples of suitable acids are the hydrohalic acids (hydrochloric being particularly preferred), phosphoric acid, mono- and bifunctional carboxylic acids, such as acetic acid, propionic acid, maleic acid, succinic acid, fumaric acid, tartaric acid, citric acid, salicylic acid, sorbic acid, lactic acid and 1,5-naphthalene-disulphonic acid. The hydrohalides, especially the hydrochlorides, lactates and salicylates are of particular value.

In a particular preferred embodiment of the present invention, the N-trityl-imidazoles have the formula:

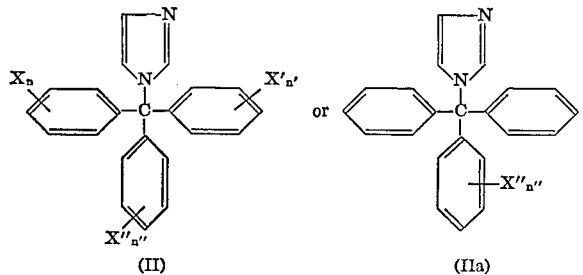

wherein X, X' and X" are alkyl of 1 to 12 carbon atoms or electro-negative substituents and $n$, $n'$ and $n''$ are 1 or 2. With regard to Formula IIa, particularly preferred substituent values are those where X" is fluorine, chlorine, bromine, iodine, $NO_2$, $CF_3$, CN, $SCH_3$, $OCH_3$ and $n''$ is 1.

Of these compounds, the present invention comprises the novel compound 1-(m-tolyl-diphenyl-methyl)-imidazole, i.e. when X" is m-methyl and $n''$ is 1. The present invention also particularly comprises pharmaceutical compositions useful for the treatment of fungal infections in human and animals which comprises a therapeutically effective amount of a compound of the formula (IIa) wherein X" is o-methyl or m-methyl and $n''$ is 1, sufficient to be therapeutically effective against fungi pathogenic to humans and animals, in a combination with a pharmaceutically acceptable non-toxic inert diluent or carrier. The present invention also includes a method of treating fungal infections in humans and animals which comprises administering to a human or animal so afflicted an amount sufficient to be therapeutically effective against said infection of a compound of the formula (IIa) wherein X" is o-methyl or m-methyl and $n''$ is 1. Pharmaceutically acceptable non-toxic salts of these compounds also form part of the instant invention.

The activity of the o-methyl and m-methyl-phenyl-diphenyl methyl-imidazoles against fungi pathogenic to humans is all the more surprising and unexpected because the closely related 1-(p-methylphenyl-diphenyl-methyl)-imidazole i.e. 1-(p-tolyl-diphenyl-methyl)-imidazole exhibits little or no activity against such fungi.

The compounds of the present invention can be prepared according to techniques *per se* known, such as by reacting silver salts or alkali metal salts, in particular the potassium salts of imidazoles of the Formula III with trityl halides of the Formula IV:

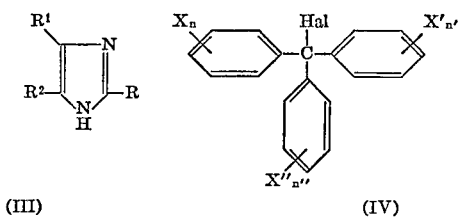

wherein R, $R^1$ and $R^2$, X, X' and X" and $n$, $n'$ and $n''$ have the above meanings and Hal is chlorine, bromine or iodine, in an inert solvent such as benzene, toluene, hexane, cyclohexane or diethyl ether, at a temperature of from about 20° C. to about 110° C. [cf. Chem. Ber. 92. 92 (1959); 93, 570 (1960)].

The compounds of the present invention can also be prepared according to techniques *per se* known by reacting imidazole derivatives of the Formula III with tritylcarbinols (cf. the reaction of the carbinol corresponding to the halide IV with secondary amines). In this case, the imidazole is generally used in an excess of up to about 100%. If the process is carried out under pressure, molar amounts may be used. Furthermore, it may be expedient to carry out the elimination of water azeotropically in the presence of a high boiling inert organic solvent, such as xylene, chlorobenzenes and the like, at the boiling point of the solvent used. In the absence of solvents, the process is carried out at a temperature range of from about 140° C. to about 230° C. and preferably from about 170° C. to about 190° C.

It may further be expedient to facilitate the elimination of water by working in the presence of dehydrating agents, such as, e.g. alkaline earth metal oxides (MgO, BaO, CaO) and of $Al_2O_3$, approximately molar amounts being generally used, but possibly also an excess of up to about 2–3 moles.

The following Table gives the constants of some N-trityl-imidazoles (I, II) by way of example:

| | M.P., °C. |
|---|---|
| (a) 1-(trisphenyl-methyl)-imidazole | 226–227 |
| (b) 1-(trisphenyl-methyl)-2-methyl-imidazole | 225 |
| (c) 1-(trisphenyl-methyl)-2, 4-dimethyl-imidazole | 232 |
| (d) 1-(trisphenyl-methyl)-4, 5-diphenyl-imidazole | 228–230 |
| (e) 1-(p-chlorophenyl-diphenyl-methyl)-imidazole | 140 |
| (f) 1-(p-fluorophenyl-diphenyl-methyl)-imidazole | 145 |
| (g) 1-(p-tolyl-diphenyl-methyl)-imidazole | 128 |
| (h) 1-(trisphenyl-methyl)-benzimidazole | 180–181 |
| (i) 1-(o-chlorophenyl-diphenyl-methyl)-imidazole | 147–149 |
| (j) 1-(m-chlorophenyl-diphenyl-methyl)-imidazole | 114 |
| (k) 1-(p-bromophenyl-diphenyl-methyl)-imidazole | 152 |
| (l) 1-(o-fluorophenyl-diphenyl-methyl)-imidazole | 185 |
| (m) 1-(m-fluorophenyl-diphenyl-methyl)-imidazole | 174 |
| (n) 1-(p-nitrophenyl-diphenyl-methyl)-imidazole | 160–170 |
| (o) 1-(m-trifluoromethylphenyl-diphenyl-methyl)-imidazole | 156 |
| (p) 1-(p-cyanophenyl-diphenyl-methyl)-imidazole | 164 |
| (q) 1-(o-methoxyphenyl-diphenyl-methyl)-imidazole | 130 |
| (r) 1-(p-methylthiophenyl-diphenyl-methyl)imidazole | 142 |
| (s) 1-(p-fluorophenyl-diphenyl-methyl)-2-methyl-imidazole | 199 |
| (t) 1-(p-fluorophenyl-p-chlorophenyl-phenyl-methyl)-imidazole | 144 |
| (u) 1-(p-chlorophenyl-m-fluorophenyl-phenyl-methyl)-imidazole | 116 |
| (v) 1-(p-chloro-m-nitrophenyl-diphenyl-methyl)-imidazole | 150 |
| (w) 1-(p-bromophenyl-p-chlorophenyl-phenyl-methyl)-imidazole | 140 |
| (x) 1-(m-cyanophenyl-diphenyl-methyl)-imidazole | 119 |
| (y) 1-(o-cyanophenyl-diphenyl-methyl)imidazole | 149–151 |

EXAMPLE 1

1-[p-chlorophenyl-diphenyl-methyl]-imidazole (e)

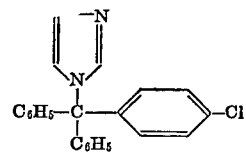

1 Mole p-chlorophenyl - diphenyl - methyl - carbinol is mixed with about 2 moles imidazole and the mixture is heated, without a solvent, at about 180° C. for 5 hours. After cooling, the reaction product is reprecipitated from xylene in order to remove the excess imidazole. After another reprecipitation from benzene light petrol, the pure 1 - [p - chlorophenyl-diphenyl-methyl]-imidazole is obtained. M.p. 140–143° C.; yield 53% of theory.

The same compound can also be obtained, when finely powdered silver salt of imidazole is suspended with the equimolar amount of p - chlorophenyl-diphenyl-methyl chloride in absolute benzene, the mixture is heated with stirring and with the exclusion of light at boiling temperature for about 3 hours, the precipitated silver chloride is subsequently filtered off and the residue remaining after removal of the solvent is recrystallised from benzene/light petrol.

By analogous procedure, 1-(tris-phenyl-methyl)-imidazole is produced from 1-tris-phenyl-methyl-carbinol and imidazole and 1-(p-tolyl-diphenyl)-imidazole is produced from 1-p-tolyl-diphenyl-methyl-carbinol and imidazole.

The other compounds (I, II) can also be obtained according to the above processes. The conversion of the free compounds into the salts is likewise carried out in known manner.

SALTS OF TRITYL-IMIDAZOLES

N-triphenyl-methyl-imidazolium lactate 31 g. N-trityl-imidazole are dissolved by heating in acetonitrile and 10 g. (0.11 mole) d,l-lactic acid are subsequently added. The residue remaining after distilling off the solvent is caused to crystallise by covering it with ether, the crystallisation product is washed with ether and dried.

Yield 40 g. of a colourless crystalline powder of M.P. 170–180° C.

N-triphenyl-methyl-imidazolium chloride 31 g. N-trityl-imidazole are dissolved in 400 ml. carbon tetrachloride, and hydrogen chloride is subsequently passed into the solution at room temperature. The hydrochloride is precipitated after some time and filtered off with suction. Colourless crystals of M.P. 155° C. after recrystallisation from acetone/ether 1:1. Yield 33 g.

The following salts are obtained in an analogous manner:

| | M.P. |
|---|---|
| N-triphenylmethyl-imidazolium maleate | 106–117 |
| N-triphenylmethyl-imidazolium tartrate | 175–180 |
| N-triphenylmethyl-imidazolium citrate | 138–145 |
| N-triphenylmethyl-imidazolium acetate | 231 |
| N-triphenylmethyl-imidazolium salicylate | 145–168 |
| N-triphenylmethyl-imidazolium sorbate | 148–160 |
| N-triphenylmethyl-imidazolium succinate | 188–189 |
| N-triphenylmethyl-imidazolium fumarate | 200–206 |
| 1-(p-chlorophenyl-diphenyl-methyl)imidazolium-chloride | 128–30 |
| 1-(p-chlorophenyl-diphenyl-methyl)-imidazolium-lactate | 90 |
| 1-(p-chlorophenyl-diphenyl-methyl)-imidazolium-salicylate | oil |
| 1-(m-chlorophenyl-diphenyl-methyl)-imidazolium hydrochloride | 153 |
| 1-(o-chlorophenyl-diphenyl-methyl)-imidazolium-chloride | 159 |
| 1-(p-fluorophenyl-diphenyl-methyl)-imidazolium-chloride | 110 |
| 1-(p-fluorophenyl-diphenyl-methyl)-imidazolium-lactate | 95 |
| 1-(o-fluorophenyl-diphenyl-methyl)-imidazolium-lactate | 110 |
| 1-(m-fluorophenyl-diphenyl-methyl)-imidazolium-lactate | 120 |
| 1-(p-fluorophenyl-diphenyl-methyl)-imidazolium-salicylate | 80 |
| 1-(p-cyanophenyl-diphenyl-methyl)-imidazolium-chloride | 147 |
| 1-(o-cyanophenyl-diphenyl-methyl)-imidazolium-chloride | 131 |
| 1-(p-cyanophenyl-diphenyl-methyl)-imidazolium-lactate | 90 |

EXAMPLE 2

1-(o-tolyl-diphenyl-methyl)-imidazole

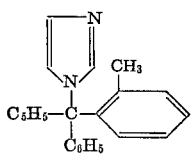

27 g. (0.1 mole) o-tolyl-diphenyl-methyl-carbinol is mixed with 13.6 g. (0.2 Moles) imidazole and the mixture is heated without a solvent, at about 170° C. for 5 hours. By vacuum (20 mm. Hg.) at a temperature of about 170° C. water and the excess of imidazole are removed. The residue is recrystallized from absolute xylene. 9.7 g. (yield 30% of theory) 1-(o-tolyl-diphenyl-methyl)-imidazole are obtained: M.P. 127–129° C.

EXAMPLE 3

1-(-m-tolyl-diphenyl-methyl)-imidazol

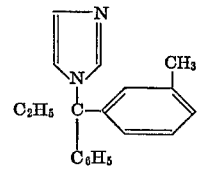

8.7 g. (0.05 moles) silver salt of imidazole are suspended with 14 g. (0.05 moles) m-tolyl-diphenyl-methyl-chloride in absolute benzene. The mixture is heated with stirring and with the exclusion of light at boiling temperature for about 4 hours. The precipitated silver chloride is subsequently filtered off. The remaining residue after removal of the solvent is 1-(m-tolyl-diphenyl-methyl)-imidazole. Yield 3.2 g. (20% of theory) of an oil.

The previously known antimycotics are effective either only against yeasts, such as e.g. Amphotericin B, or only against hyphomycetes, such as e.g. Griseofulvin.

In contrast thereto and surprisingly, the compounds (I, II) and their salts are effective against hyphomycetes as well as against yeasts, even in the case of oral administration. It is another advantage that the compounds according to the invention are well tolerated by warmblooded animals.

The compounds can be used as antimycotics, *inter alia*, in the form of an aqueous emulsion, suspension or solution which can be administered *per os*. It is also possible to use aqueous solutions of the new salts of the said compounds (I).

THERAPEUTIC EFFECT

1. *In vitro*—effect against human-pathogenic fungi:
  (a) *Candida albicans:*
    Compound (a) 40 γ/ml  ⎫
    Compound (e) <4 γ/ml  ⎬ Fungistatic.
    Compound (f) <4 γ/ml  ⎭
    Compound (g) <4 γ/ml
    Compound (i) <4 γ/ml
    Compound (p) <4 γ/ml
  (b) *Trichophyton mentagrophytes:* <4–10 γ fungistatic microsp. fel. <4 γ.

The test medium was Mileau d'épreuve according to Sabouraud.

The spectrum of activity and the intensity of activity (compound *i*) (*in vitro*) can be seen from the following Table:

Minimum inhibiting concentration as γ/ml.

| | Without serum | With serum |
|---|---|---|
| (1) *Trich. asteroides* | 1 | 1 |
| (2) *Trich. crateriforms* | 1 | 10 |
| (3) *Trich. equinum* (NL) | 1 | 10 |
| (4) *Trich. equinum*, woolly (Hoechst) | 1 | 10 |
| (5) *Trich. equinum*, gran. (Hoechst) | 1 | 10 |
| (6) *Trich. tonsurans* | 1 | 2 |
| (7) *Trich. verrucosum* | 1 | 4 |
| (8) *Trich. granulosum* | 1 | 2 |
| (9) *Trich. interdigitale* | 1 | 4 |
| (10) *Trich. megninii* | <0.1 | 1 |
| (11) *Trich. mentagrophytes* | <0.1 | 1 |
| (12) *Trich. rubrum* | 1 | 2 |
| (13) *Microsp. audouinii* | 1 | |
| (14) *Microsp. canis* (NL) | <0.1 | |
| (15) *Microsp. canis* (our Isolation) | 1 | |
| (16) *Microsp. duboisii* | 1 | |
| (17) *Microsp. fulvum* | 1 | |
| (18) *Microsp. gallinae* | 1 | |
| (19) *Microsp. felineum* | 1 | |
| (20) *Aspergillus niger* | 1 | 4 |
| (21) *Pen. comune* | 1 | |
| (22) *Mucor mucedo* | 4 | >10 |
| (23) *Blakeslea trispora* | 10 | >10 |
| (24) *Cand. albicans* | 40–1 fungistase | 40–1 |

2. *Effect in vivo*

(a) Experimental candidosis in white mice

In the case of oral administration, curative effects can be achieved with daily doses of 2–3 times 0.5–1 mg./mouse/day.

(b) Experimental trychophytia in mice caused by *Trich. quinckeanum*:

Development of the infection is prevented by daily doses of 1–2 times 1–2 mg./mouse orally.

(c) Experimental trichophytia in guinea pigs caused by *Trich.ment.*

When 15–30 mg. are administered twice *per os* to guinea pigs weighing 400 grams, a reproducible effect on the course of the infection and rapid healing of the mycotic lesions is found.

Equally effective results are produced when other compounds within the scope of (I) or salts of compounds within the scope of (I) and specifically salts of compounds (a), (e), (f), (g), (i) and (P) are used. Compounds which are unsubstituted in the imidazole ring may be substituted in one phenyl group by a halogen atom, preferably chlorine or fluorine in the o-, m- or p-position; such compounds and their salts with hydrochloric acid, lactic acid or salicylic acid are particularly useful. Tests were conducted to compare the *in vivo* effectiveness of the o-methyl and m-methyl-phenyl-diphenyl-methyl-imidazoles against *candida albicans, cryptococcus, trichophyton quinckeanum, microsporum canis* and *trich. mentagrophytes, histoplasma* and *aspergillus* and the activity of p-methylphenyl-diphenyl-methyl imidazole i.e. 1-(p-tolyl-diphenyl-methyl)-imidazole, against *candida ablicans, trichophyton quinckeanum, microsporum canis* and *trich. mentagrophytes* and *aspergillus*.

The test procedure used was as follows:

(a) Experimental candidiasis

Test arrangement:

White mice ($\male$) of strain $CF_1$-SPF, weighing 20–22 g. were injected i.v. in the caudal vein with 1 to $2 \times 10^6$ *Candida albicans* cells of a 24-hour culture (adjusted through the measurement of the turbidity by means of a photometer). Beginning with the third day, and to an increased extent on the 4th and 5th day after injection, untreated animals died of the infection. In the therapeutic experiment 20 animals were used for each dose and control group. The treatment was applied orally and parenterally 1–0.5 hour prior to and 6–8 hours after the infection. In the case of oral treatment the dose in question was administered in 0.5 ml. of a glucose-agar solution (5% glucose, 0.2% agar, 2% DMF for dissolving the preparation, and water to make up to 100%); in the case of parenteral treatment the dose was administered in 0.2 ml. of a 2% aqueous solution of DMF. At the end of the test period the survival rate was determined and is listed in the table.

(b) Experimental trichophytosis of the white mouse induced by *Trichophyton quinckeanum*

The backs of male or female animals of strain $CF_1$-SPF weighing 20–33 g. were shaved in such a way that the length of the residual hair amounted to about 3/10 mm., and no skin lesions were produced. Thereupon the animals were infected by rubbing 0.3 ml. of a 24-hour spore culture of *Trich. quinckeanum* in nutrient solution into the shaved skin of the back. The Trichophyton culture contained an average of 3,000–4,000 infectious particles per ml.

With this method of infection the animals exhibited, 8–12 days after infection, multiple (up to 20) scutula 0.8–2.2 mm. in diameter at the infection site, which fell off 16–20 days after the infection, leaving small, bloody foci.

Twenty animals were used for each control group and therapy group. A dose of 100 mg./kg. per 24 hours, suspended in 0.5 ml. of glucose-agar solution, was administered orally once daily from the day of infection to the eighth day after infection. On the 14th day the percent of mice exhibiting no scutula i.e., in which the infection did not develop, was determined and is listed in the table.

The same results were obtained with a parenteral or local treatment.

(c) Experimental murine histoplasmosis induced by *H. capsulatum*

The experimental murine histoplasmosis induced by Histoplasma capsulatum is a septic syndrome which runs a very uniform course, causing the death of infected mice on the 4th to 6th day after infection. The latter is brought about i.v. with $5 \times 10^5$ H. capsulatum cells of a 36-hour culture. Volume of infection [sic]: 0.2 ml. Animal strain used: $CF_1$-SPF-mice.

Twenty animals were used per control and treatment group. A single dose of 100 mg. per kg. of body weight was administered orally 1.5 or 0.5 hour before the infection or 3 hours after the infection. On the 6th day after infection the number of surviving animals was determined; this number, expressed in percent, is listed in the table.

(d) I.V. or I.P. infection with Aspergillus spores

In the case of $CF_1$-SPF mice, the administration of $5 \times 10^4$ spores per mouse leads to a disease picture which runs its course predominantly in the kidneys, with a fatal outcome in about 80% of the infected animals on the 16–20th day after infection. The oral therapy was begun with the administration of a dose of 50 mg./kg. given twice daily, starting on the day of infection and continued for 5 days. On the 20th day the survival rate was determined; the results, expressed in percent, are listed in the table.

Experimental Cryptococcus infection of the mouse

Test Arrangement:

White mice ($\male$) of strain $CF_1$-SPF, weighing 20–22 g., were infected with $1 \times 10^5$ Cryptococcus cells each, injected into the caudal vein. Between the 2nd and 7th day after infection untreated animals died from the infection. In the therapeutic experiment 20 animals were used for each dose and control group. The treatment was administered orally and parenterally 1 to 0.5 hour before and 6 to 8 hours after the infection. In the case of oral treatment the dose in question was injected in 0.5 ml. of glucose-agar solution (5% glucose, 0.2% agar, 2% DMF for dissolving the preparation, and water to make up to 100%), while in the parenteral treatment the dose was dissolved in 0.2 ml. of a 2% aqueous DMF solution. The test substances were administered orally or parenterally in a dose of 50 mg. per kg. of body weight given twice during a 24-hour period. On the 5th day after infection the survival rates were determined; the results, expressed in percent, are listed in the table.

Experimental Microsporum and *Trichophyton mentagrophytes* infection of the guinea pig White, smooth-haired guinea pigs ($\male$ or $\female$) of our own breeding, which were definitely free from dermatophytes, were infected by rubbing 1.0 ml. of a spore suspension of Microsporum or Trichophyton containing about $10^4$ infectious particles per ml. into the non-scarified skin of the back. Local therapy was administered by means of 1% solutions of the various preparations, beginning with the third day after infection and ending with the 16th days after infection. The size and depth of the dermatomycosis in comparison to the untreated control group were determined on the basis of a rating scale of 0 to 5, with 0 representing a clinically normal finding and 5 a deep, bleeding ulceration. In the tables 100% signifies a normal finding (C) and 0% signifies a deep bleeding ulceration (5). This data is set forth in the table.

TABLE

In vivo effectiveness of methyl substituted tritylimidazoles

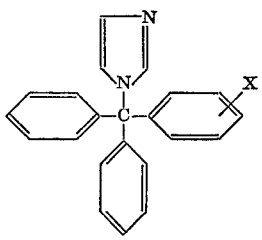

| | | | | Percent | | |
|---|---|---|---|---|---|---|
| X | Candida[1] albicans | Cryptococcus[1] | Trichophyton[2] quinckeanum | Microsporum[3] canis and Trich. mentagrophytes | Histoplasma[1] | Aspergillus[1] |
| o-CH$_3$ | 100 | 100 | 90 | 100 | 100 | 80 |
| m-CH$_3$ | 50 | 60 | 50 | 50 | 60 | 50 |
| p-CH$_3$ | 5 | ------- | 10 | 10 | ------- | 10 |

[1] Survival rate in percent.
[2] Percent of animals in which the infection did not develop (no scutula or signs of infection on the skin).
[3] 100% signifies a normal finding; 0% signifies a deep bleeding ulceration.

The results set forth in the preceding table demonstrate the unexpected activity of the o-methyl and m-methylphenyl-diphenyl-methyl-imidazoles as compared to the p-methylphenyl-diphenyl-methyl imidazole.

The following usages and dosage ranges are used for the compounds of the present invention:

(a) for use with humans:
1. dermatomycoses, caused by fungi of the species *Trychophyates, Microsporium, Epidermophytes, Aspergillus, Candida albicans* and other yeasts;
2. organomycoses caused by yeasts, mould fungi and dermatophytes;

(b) for veterinary uses:
dermatomycoses and organomycoses caused by yeasts, mould fungi and dermatophytes.

The compounds of the present invention are administered orally or parenterally as well as locally in the form of solutions, e.g., dimethyl sulphoxide/glycerol/water 2:2:6, alcohol, preferably ethanol and isopropanol, buffer solutions, powders, tablets.

The dosage range for humans is in the range of from about 20 to about 100 mg./kg. and preferably from about 40 to about 60 mg./kg. Administration is generally recommended at intervals of about 12 hours and such administration should be continued for from about 10 to about 60 days.

Nevertheless it may sometimes be necessary to digress from the aforesaid amounts, dependent on the method of administration or also on account of individual reactions to the medicine or on the type of its formulation and the moment in time or the intervals at which it is administered. In some cases, it may be sufficient to use less than the minimum amount stated above, whereas in other cases it may be necessary to go beyond the stated upper limit. If larger amounts are applied, it may be advisable to distribute these over a day in several individual doses.

The compounds of the present invention can be used either as such or in combination with pharmaceutically acceptable carriers. Suitable forms for administration in combination with various inert carriers are tablets, capsules, powders, sprays, aqueous suspensions, injectable solutions, elixirs, syrups and the like. Carriers of this type comprise solid extenders or fillers, a sterile aqueous medium as well as various non-toxic organic solvents and the like. Obviously, the tablets and the like suitable for oral administration can be provided with an addition of saccharin or a similar additive. In the aforesaid case, the therapeutically active compound should be present in the total mixture at a concentration of about 0.5 to 90 percent by weight, i.e., in quantities with suffice to attain the range of dosage mentioned above.

In the case of oral administration, obviously, tablets may also contain additives such as sodium citrate, calcium carbonate and dicalcium phosphate together with various additives such as starch, preferably potato starch and the like, and binders such as polyvinyl-pyrrolidone, gelatin and the like. It is further possible to add lubricants such as magnesium stearate, sodium lauryl-sulphate and talc for producing tablets. In the case of aqueous suspensions and/or elixirs which are intended for oral administration, the active ingredient may be used together with various agents for improving the flavor, dyestuffs, emulsifiers and/or diluents, such as water, ethanol, propyleneglycol, glycerol and other compounds or combinations of this type.

In thec ase of parenteral administration, there may be used solutions of the active ingerdients in sesame or peanut oil or in aqueous propylene-glycol of N,N-dimethyl formamide, as well as sterile aqueous solutions if the compounds are water-soluble. Such aqueous solution should be buffered in the usual manner, if required, and the liquid diluent should previously be rendered isotonic by the addition of the necessary amount of salt or glucose. These aqueous solutions are particularly suitable for intravanous, intramuscular and intraperitoneal injections.

In humans, a dosage of 40 mg./kg. administered at intervals of 12 hours result in a blood level of between 5 and 11 γ/ml. The half-life period in human serum *in vivo* amounts to 6 hours on the average. Up to 30 to 40% of the administered amount of the substance are excreted with the urine in active form. The resorption qota amounts to more than 70% in the case of oral administration.

The LD$_{50}$ for mice, rats, rabbits, dogs and cats lies between about 600 and 2200 mg. of the stated compounds/kg. body weight in the case of oral administration.

The present invention also includes pharmaceutical compositions comprising at least one of the N-trityl-imidazoles or salts thereof in admixture with a solid or liquid diluent or carrier which may be any of the conventional diluents or carriers used in pharmaceutical compositions.

The present invention also includes unit dosage forms of medication which comprise at least one of the compounds of the present invention either alone or in admixture with a solid or liquid diluent or carrier. The compounds of the present application may include a protective envelope or cover containing the active compound within. Unit dosage form means that the composition is in the form of discrete portions, each containing a unit dose or a multiple or sub-multiple of the unit dose of the active ingredient which is the compound of the present invention. Such portions may, for example, be in monolithic coherent form, such as tablets, suppositories, pills or dragees; in wrapped or concealed form, such as wrapped powders, cachets, sachets or capsules, in ampules such as in sterile solution; or in othre forms known to the art.

What is claimed is:

1. An antifungal composition useful for administration to humans and animals, which comprises an amount of a compound of the formula:

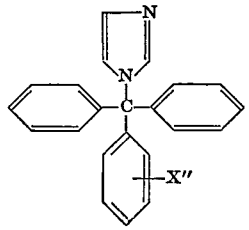

wherein X" is m-methyl, or a pharmaceutically acceptable non-toxic salt thereof, sufficient to be therapeutically effective against fungi pathogenic to humans and animals, in combination with a pharmaceutically acceptable non-toxic inert diluent or carrier.

2. An antifungal composition according to claim 1, wherein the compound is 1(m-tolyl-diphenyl-methyl)-imidazole.

3. A method of treating fungal infections in humans and animals, which comprises administering to a human or animal so afflicted an amount sufficient to be therapeutically effective against said infection of a compound of the formula:

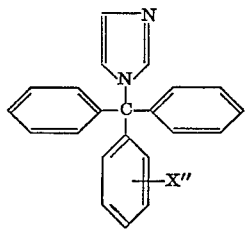

wherein X" is o-methyl or m-methyl, or a pharmaceutically acceptable non-toxic salt thereof.

4. A method according to claim 3 wherein the compound is 1-(o-tolyl-diphenyl-methyl)-imidazole.

5. A method according to claim 3 wherein the compound is 1-(m-tolyl-diphenyl-methyl)-imidazole.

References Cited
UNITED STATES PATENTS
3,321,366   5/1967   Mussell et al. _____ 424—273

JEROME D. GOLDBERG, Primary Examiner